US010447352B2

(12) United States Patent
Kundargi et al.

(10) Patent No.: US 10,447,352 B2
(45) Date of Patent: Oct. 15, 2019

(54) UE-AIDED CHANNEL RECIPROCITY COMPENSATION FOR RADIO ACCESS IN MIMO WIRELESS COMMUNICATION SYSTEMS

(71) Applicant: National Instruments Corporation, Austin, TX (US)

(72) Inventors: Nikhil U. Kundargi, Austin, TX (US); Karl F. Nieman, Austin, TX (US); Junmo Sung, Austin, TX (US)

(73) Assignee: National Instruments Corporation, Austin, TX (US)

( * ) Notice: Subject to any disclaimer, the term of this patent is extended or adjusted under 35 U.S.C. 154(b) by 0 days.

(21) Appl. No.: 15/674,282

(22) Filed: Aug. 10, 2017

(65) Prior Publication Data

US 2018/0048492 A1 Feb. 15, 2018

Related U.S. Application Data

(60) Provisional application No. 62/373,710, filed on Aug. 11, 2016.

(51) Int. Cl.
*H04B 7/0413* (2017.01)
*H04B 17/11* (2015.01)
(Continued)

(52) U.S. Cl.
CPC ........... *H04B 7/0413* (2013.01); *H04B 17/11* (2015.01); *H04B 17/14* (2015.01); *H04L 5/0023* (2013.01);
(Continued)

(58) Field of Classification Search
CPC .. H04B 7/0634; H04B 7/0626; H04B 7/0417; H04B 7/063; H04B 7/0619;
(Continued)

(56) References Cited

U.S. PATENT DOCUMENTS 4,864,309 A 9/1989 Wiley et al.
8,193,971 B2 6/2012 Vook et al.
(Continued)

OTHER PUBLICATIONS

Clayton, "Argos: Practical Many-Antenna Base Stations" (Year: 2012).*
(Continued)

*Primary Examiner* — Dung Hong
(74) *Attorney, Agent, or Firm* — Huffman Law Group, PC; E. Alan Davis

(57) ABSTRACT

A wireless cellular base station (BS) transmitter transmits a downlink calibration pilot symbol. A receiver receives from a user equipment (UE) an uplink calibration pilot symbol and an effective downlink channel estimate transmitted by the UE. The effective downlink channel estimate is computed by the UE using the downlink calibration pilot symbol received from the BS. Processing devices compute an effective uplink channel estimate using the uplink calibration pilot symbol received from the UE and compute channel reciprocity calibration coefficients using the effective downlink channel estimate received from the UE and the effective uplink channel estimate computed by the BS. The BS includes multiple antennas, and the BS computes the channel reciprocity calibration coefficients for each antenna. Alternatively, the uplink channel estimate received by the BS is an inverted version of the effective downlink channel estimate, which the processing devices use for channel reciprocity compensation.

10 Claims, 8 Drawing Sheets

(51) Int. Cl.

| | |
|---|---|
| *H04L 5/00* | (2006.01) |
| *H04L 25/02* | (2006.01) |
| *H04W 72/04* | (2009.01) |
| *H04W 72/08* | (2009.01) |
| *H04L 27/26* | (2006.01) |
| *H04B 17/14* | (2015.01) |
| *H04W 88/08* | (2009.01) |
| *H04B 7/06* | (2006.01) |
| *H04W 88/02* | (2009.01) |

(52) U.S. Cl.
CPC .......... *H04L 5/0048* (2013.01); *H04L 5/0051* (2013.01); *H04L 25/0202* (2013.01); *H04L 27/2613* (2013.01); *H04W 72/0453* (2013.01); *H04W 72/085* (2013.01); *H04B 7/0617* (2013.01); *H04L 5/001* (2013.01); *H04W 88/02* (2013.01); *H04W 88/08* (2013.01)

(58) Field of Classification Search
CPC ........ H04B 7/0632; H04L 2025/03426; H04L 2025/03802; H04L 25/0204; H04L 5/0048; H04L 25/03343; H04L 25/0202; H04W 56/00

See application file for complete search history.

(56) References Cited

U.S. PATENT DOCUMENTS

| | | | |
|---|---|---|---|
| 8,325,755 B2 | 12/2012 | Lee et al. | |
| 8,417,191 B2* | 4/2013 | Xia | H04B 7/0617 342/368 |
| 8,971,178 B1* | 3/2015 | Nabar | H04J 3/16 370/220 |
| 9,191,161 B2 | 11/2015 | Li et al. | |
| 9,444,577 B1* | 9/2016 | Zhang | H04L 1/0026 |
| 9,548,806 B2 | 1/2017 | Kim et al. | |
| 1,009,174 A1 | 10/2018 | Shin et al. | |
| 1,009,690 A1 | 10/2018 | Schwartzman et al. | |
| 1,010,377 A1 | 10/2018 | Moorti et al. | |
| 1,011,027 A1 | 10/2018 | Branlund et al. | |
| 1,011,030 A1 | 10/2018 | Harel et al. | |
| 10,097,234 B2 | 10/2018 | He et al. | |
| 1,011,869 A1 | 11/2018 | Hoffberg | |
| 1,012,895 A1 | 11/2018 | Casterline et al. | |
| 1,013,549 A1 | 11/2018 | Stratigos, Jr. | |
| 1,013,553 A1 | 11/2018 | Hazani et al. | |
| 1,013,620 A1 | 11/2018 | Cune et al. | |
| 1,013,640 A1 | 11/2018 | Djordje Tujkovic | |
| 1,014,195 A1 | 11/2018 | Saban et al. | |
| 10,128,929 B2* | 11/2018 | Wich | H04B 7/0408 |
| 10,135,508 B2 | 11/2018 | Won et al. | |
| 10,142,001 B2 | 11/2018 | Ling | |
| 10,142,082 B1 | 11/2018 | Shattil | |
| 2005/0030021 A1 | 2/2005 | Prammer et al. | |
| 2010/0150013 A1* | 6/2010 | Hara | H04L 25/0224 370/252 |
| 2011/0263280 A1 | 10/2011 | Guey | |
| 2012/0314563 A1* | 12/2012 | Luo | H04B 17/11 370/216 |
| 2015/0071310 A1 | 3/2015 | Kim et al. | |
| 2015/0222336 A1 | 8/2015 | Yilmaz et al. | |
| 2015/0326286 A1 | 11/2015 | Wong et al. | |
| 2015/0326291 A1 | 11/2015 | Wong et al. | |
| 2015/0326383 A1 | 11/2015 | Wong et al. | |
| 2016/0308624 A1* | 10/2016 | Rong | H04B 7/024 |
| 2017/0290013 A1* | 10/2017 | McCoy | H04L 5/005 |
| 2018/0091207 A1* | 3/2018 | Kakishima | H04B 7/0413 |
| 2018/0337717 A1 | 11/2018 | Nasiri Khormuji et al. | |
| 2018/0338321 A1* | 11/2018 | Shepard | H04B 7/0452 |
| 2019/0028155 A1 | 1/2019 | Hofrichter et al. | |

OTHER PUBLICATIONS

Rusek, F. et al. "Scaling up MIMO: Opportunities and Challenges with Very Large Arrays." Signal Processing MagazineIEEE. pp. 40-60, 2013.

Vieira et al. "Reciprocity Calibration for Massive MIMO: Proposal, Modeling and Validation." IEEE Transactions on Wireless Communicatios. Published Mar. 17, 2017 pp. 1-15.

Vieira et al., "*Reciprocity Calibration Methods for Massive MIMO Based on Antenna Coupling*", Department of Electrical Engineering, Lund University, Jan. 1, 2014, pp. 1-6.

Harris et al., "*University of Bristol and Lund University Partner with NI to Set World Records in 5G Wireless Spectral Efficiency Using Massive MIMO*", dowloaded from www.ni.com, May 2016, pp. 1-7.

"*LTE in a Nutshell—Physical Layer*", Telesystem Innovations Inc. White Paper, 2010, pp. 1-10.

"*An Introduction to Orthogonal Frequency Division Multiplex Technology*", Keithley Instruments, Inc., 2008, pp. 1-66.

Huawei, "WF on CSI Acquisition in NR", 3GPP TSG RAB WG1 Meeting #85, May 23-27, 2016, pp. 1-4.

Huawei et al., "*WF on CSI Acquisition Framework in NR*", 3GPP TSG RAN WG1 Meeting #85, May 23-27, 2016, pp. 1-3.

"*Study on Latency Reduction Techniques for LTE*", 3GPP TR 36.881 Vo.6.0 Technical Report, Feb. 2016, pp. 1-92.

"*Study on Scenarios and Requirements for Next Generation Access Technologies*", 3GPP TR 38.913 Vo.2.0, Feb. 2016, pp. 1-19.

Vieira et al., "*A Flexible 100-Antenna Testbed for Massive MIMO*", Department of Electrical Information Technology at Lund University, Jan. 1, 2014, pp. 1-7.

"Bristol and Lund Set a New World Record in 5G Wireless Spectrum Efficiency" Bristol Univeristy, News, March: Massive MIMO demonstration, Mar. 23, 2016, pp. 1-6.

"Study on NR New Radio Access Technology", 3GPP TSG RAN Meeting #71, Goteborg, Sweden, Mar. 7-10, 2016, pp. 1-8.

"*LTE Small Cell Enhancement by Dual Connectivity*", Wireless World Research Forum, Outlook Visions and Research Directions for the Wireless World, Whitepaper, Nov. 2014, pp. 1-22.

"*LTE in a Nutshell: Protocol Architecture*" Telesystem Innovations Inc. White Paper, 2010, pp. 1-12.

"*LTE Random Access Procedure*" http://www.eventhelix.com/eventstudio/, Jul. 28, 2017, pp. 1-5.

Luther, "*5G Massive MIMO Testbed: From Theory to Reality*", National Instruments, Jun. 8, 2016, pp. 1-11.

"*Introduction to the NI mmWave Transceiver System Hardware*", National Instruments, Apr. 20, 2016, pp. 1-8.

"National Instruments Wireless Research Handbook", National Instruments, May 2016, pp. 1-37.

Shepard et al. "*Argos: Practical Many-Antenna Base Stations*" MobiCom 12, Aug. 22-26, 2012, Istanbul, Turkey, pp. 53-64.

Khoolenjani, et al. "*Distribution of the Ratio of Normal and Rice Random Variables*" Digital Commons @WayneState, Journal of Modern Applied Statistical Methods, vol. 12, Issue 2, Article 27, Nov. 1, 2013, pp. 1-15.

Shen et al. "*Channel Estimation in OFDM Systems*", Freescale Semiconductor, Inc. Application Note, Jan. 2006, pp. 1-16.

\* cited by examiner

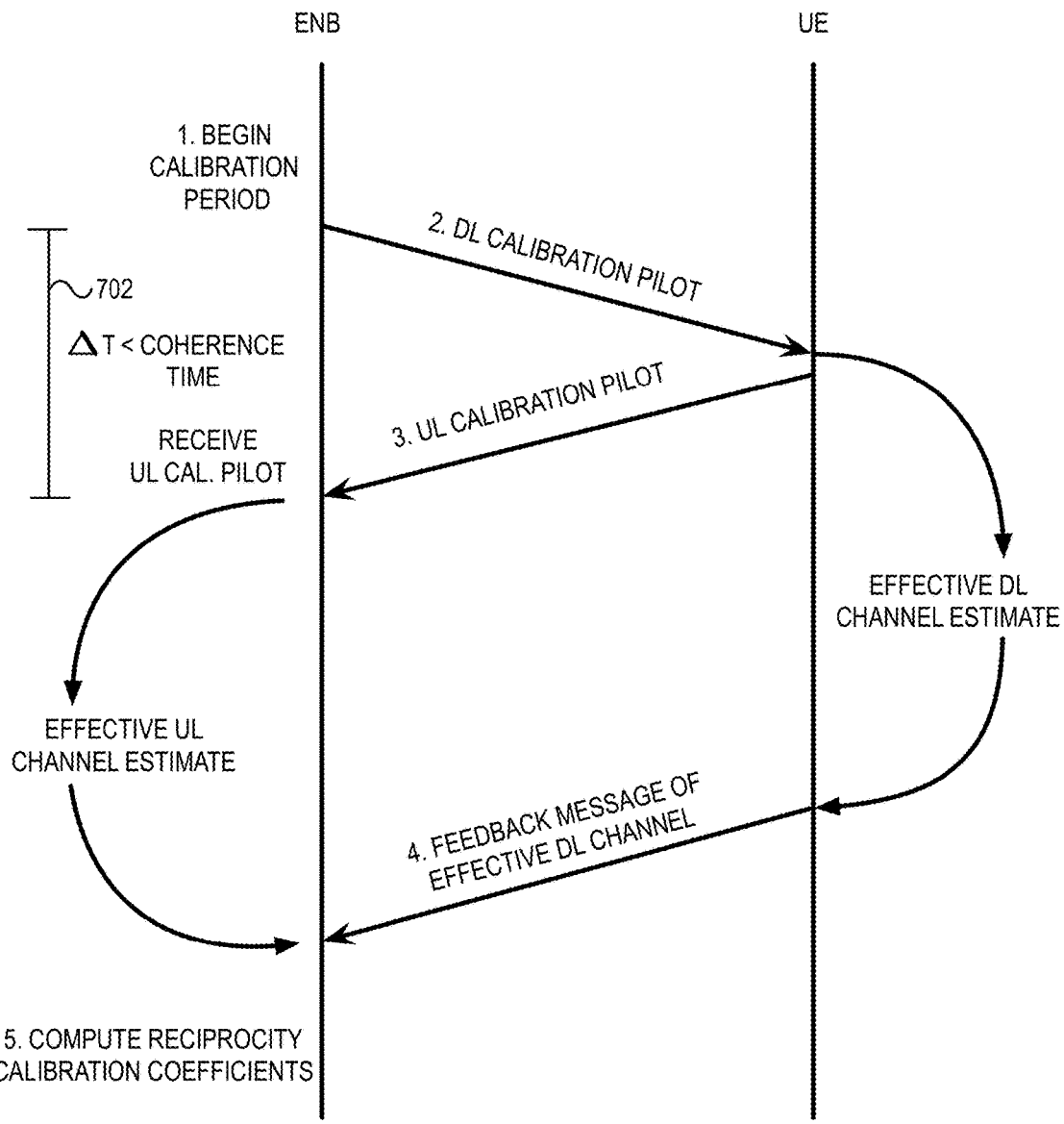

UE-AIDED CHANNEL RECIPROCITY COMPENSATION FOR RADIO ACCESS IN MIMO WIRELESS COMMUNICATION SYSTEMS

This application claims the benefit of U.S. Provisional Application No. 62/373,710, filed on Aug. 11, 2016 which is hereby incorporated by reference in its entirety as though fully and completely set forth herein.

BACKGROUND

Technical Field

The disclosed embodiments relate to mobile telecommunications.

The New Radio (NR) definition in 3GPP ($3^{rd}$ Generation Partnership Project) for mobile systems will encompass a variety of deployment scenarios envisioned for 5G (fifth generation) mobile communication systems. MIMO (multiple input, multiple output) communication systems can be used for 5G TDD (time division duplex) air interfaces. In particular, massive MIMO reciprocity-based TDD air interfaces allow for symbol-level switching and potential configurability that in turn allow for features to support various aspects of 5G air interfaces, for example, enhanced Mobile BroadBand (eMBB), massive Machine Type Communications (mMTC) and Ultra-Reliable and Low Latency Communications (URLLC). Example embodiments for massive MIMO communication systems and related reciprocity-based TDD air interfaces are described within U.S. Published Patent Application 2015/0326286, entitled "MASSIVE MIMO ARCHITECTURE," U.S. Published Patent Application 2015/0326383, entitled "SYNCHRONIZATION OF LARGE ANTENNA COUNT SYSTEMS," and U.S. Published Patent Application 2015/0326291, entitled "SIGNALING AND FRAME STRUCTURE FOR MASSIVE MIMO CELLULAR TELECOMMUNICATION SYSTEMS," each of which is hereby incorporated by reference in its entirety.

Beamforming in massive MIMO communication systems is based upon the time reversal property of electromagnetic waves. The wireless channels used for such MIMO communications are typically reciprocal in the UL (uplink) direction and the DL (downlink) direction. One use of this reciprocity is to reuse the UL channel estimate for DL precoding to gain a significant reduction in channel estimation overhead as compared to an alternative option of sending DL pilots from each DL antenna port and receiving the CSI/PMI (channel state information/precoding matrix index) feedback on the UL channel. This use of reciprocity is an attractive feature for large antenna count MIMO scenarios.

FIG. 1 (Prior Art) is a diagram of an example embodiment for channel reciprocity associated with a base station 102 with M antennas 104 that provides a wireless MIMO communication system 100. The MIMO base station 102 communicates through its M antennas 104 with K different user equipment (UE) devices 106, such as mobile handsets, that each also have an antenna 108. Based on electromagnetic properties, ideal channel reciprocity for a wireless communication channel between one of the base station antennas 104 and one of the UE antennas 108 will provide that the uplink (UL) channel and the downlink (DL) channel will have identical responses. As shown in FIG. 1, the DL channel response ($DLh_{m,k}$) from a base station antenna (m) 104 to a UE antenna (k) 108 will match the return UL channel response ($ULh_{k,m}$) from the same UE antenna (k) 108 to the same base station antenna (m) 104. Over time (T), therefore, the overall DL channel response ($H_{DL}$) will also match the overall UL channel response ($H_{UL}$).

FIG. 2 (Prior Art) is a diagram for ideal channel reciprocity where OFDM (orthogonal frequency division multiplex) communications are being used between a base station 202 with M antennas 204 and N users of user equipment (UE) devices 206 each having an antenna 208. The wireless RF (radio frequency) propagation channel 212 is considered to be reciprocal in the uplink (UL) and downlink (DL) communications as shown in FIG. 2. It is noted that this channel reciprocity is intended to be exploited in a number of ways to simplify system design in New Radio (NR) Access Technology standard being developed by 3GPP ($3^{rd}$ Generation Partnership Project) for 5G (fifth generation) mobile communications. Example potential uses of channel reciprocity for the NR standard include: obtaining DL CSI (channel state information) from UL Sounding Pilots, obtaining UL CSI from DL Pilots for initial access/random access, and selecting beam direction in UL/DL based on received beam direction in DL/UL, respectively. It is noted that for FIG. 2 and FIG. 3 below, it is assumed that the number (M) of base station antennas 204 is much greater than the number (N) of user antennas 208 (M>>N). For example, the number (M) of base station antennas 204 can be ten times or more greater than the number (N) of user antennas 208 (M≥10*N).

FIG. 3 (Prior Art) is a diagram for a real system 300 including non-ideal channel reciprocity where OFDM (orthogonal frequency division multiplex) communications are being used between a base station 302 with M antennas 304 and N users of user equipment (UE) devices 306 each having an antenna 308. Although the RF channel is reciprocal between each user antenna 308 and each base station antenna 304, the effective RF channel is not reciprocal in a practical system. The effective channel includes linear and non-linear components, and linear impairments can occur such as within RF front end circuitry 312 for the UEs and/or the base station. The two largest contributors to such linear impairments are typically PLL (phase lock loop) phase ambiguity and temperature dependencies of delay in transmit (TX) and receive (RX) paths which are not reciprocal and often slowly time varying. Due to this reciprocity mismatch, the effective UL channel is not reciprocal to the effective DL channel. Such a reciprocity mismatch has long been recognized to be a potential issue. While solutions have been proposed to mitigate the effects of this mismatch, improved reciprocity calibration and compensation is needed for a reciprocity-based TDD (time division duplex) system such as being considered for the NR standard.

In prior systems, reciprocity calibration is usually done within the base station (e.g., eNodeB) without using over the air signaling. For example, a typical implementation for a base station might use circuitry based calibration implemented within the base station without the use of over the air signaling. Such a self-contained approach, however, is not scalable when different system components are not closely co-located (e.g., a massive MIMO system built using distributed components) and/or when the number of antennas at the base station is increased by an order of magnitude, for example, increased to the 64 to 256 antenna systems being proposed in the NR definition.

SUMMARY

Channel reciprocity compensation embodiments for MIMO (multiple input, multiple output) communication systems are disclosed. These channel reciprocity compensation embodiments can be used, for example, with the New Radio (NR) Access Technology definition in 3GPP ($3^{rd}$ Generation Partnership Project) for base stations with multiple antennas. Example embodiments are disclosed that use intra-node compensation for multiple antenna base stations, such as eNB (eNodeB) devices for LTE (long term evolution) mobile communications, to improve over the air (OTA) channel reciprocity. Example embodiments are also disclosed that use UE (user equipment) aided compensation to improve OTA channel reciprocity. These compensation techniques can also be used alone or in combination with each other. Other variations can also be implemented while still taking advantage of the reciprocity compensation techniques described herein.

In some embodiments, a method includes a cellular base station transmitting a downlink calibration pilot symbol. A user equipment (UE) computes an effective downlink channel estimate using the downlink calibration pilot symbol received from the base station. The UE transmits an uplink calibration pilot symbol. The base station computes an effective uplink channel estimate using the uplink calibration pilot symbol received from the UE. The UE transmits the effective downlink channel estimate. The base station computes channel reciprocity calibration coefficients using the effective downlink channel estimate received from the UE and the effective uplink channel estimate computed by the base station.

In some embodiments, a wireless cellular base station includes a transmitter that transmits a downlink calibration pilot symbol and a receiver that receives from a user equipment (UE) an uplink calibration pilot symbol and an effective downlink channel estimate transmitted by the UE. The effective downlink channel estimate is computed by the UE using the downlink calibration pilot symbol received from the base station. One or more processing devices compute an effective uplink channel estimate using the uplink calibration pilot symbol received from the UE and compute channel reciprocity calibration coefficients using the effective downlink channel estimate received from the UE and the effective uplink channel estimate computed by the base station.

In some embodiments, a method includes a cellular base station transmitting a downlink calibration pilot symbol. User equipment (UE) computes an effective downlink channel estimate using the downlink calibration pilot symbol received from the base station. The UE transmits an uplink calibration pilot symbol that is an inverted version of the effective downlink channel estimate. The base station uses the uplink calibration pilot symbol received from the UE for channel reciprocity compensation.

In some embodiments, a wireless cellular base station includes a transmitter that transmits a downlink calibration pilot symbol. A receiver receives from a user equipment (UE) an uplink calibration pilot symbol transmitted by the UE that is an inverted version of an effective downlink channel estimate. The inverted version of the effective downlink channel estimate is computed by the UE using the downlink calibration pilot symbol received from the base station. One or more processing devices use the uplink calibration pilot symbol received from the UE for channel reciprocity compensation.

DESCRIPTION OF THE DRAWINGS

It is noted that the appended drawings illustrate only exemplary embodiments and are, therefore, not to be considered limiting of the scope of the present inventions, for the inventions may admit to other equally effective embodiments.

FIG. 7 is a swim lane diagram of an example embodiment where UE aided compensation is used to improve reciprocity calibration.

DETAILED DESCRIPTION

Terms

Figure 1:
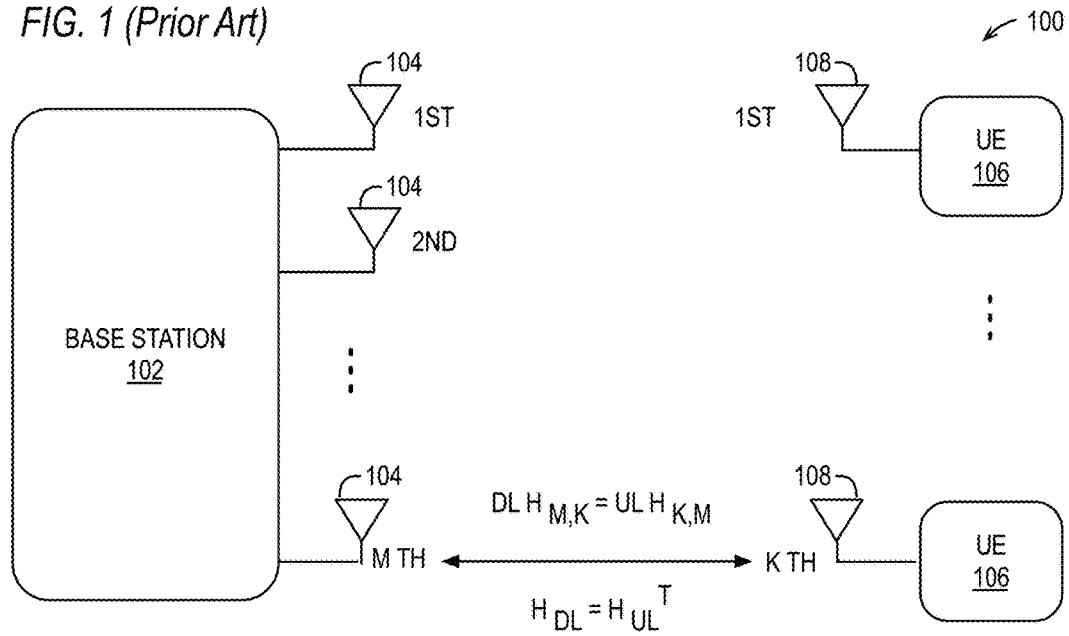
FIG. 1 (Prior Art) is a diagram of an example embodiment for channel reciprocity associated with a base station with M antennas that provides a wireless MIMO communication system.
Figure 2:
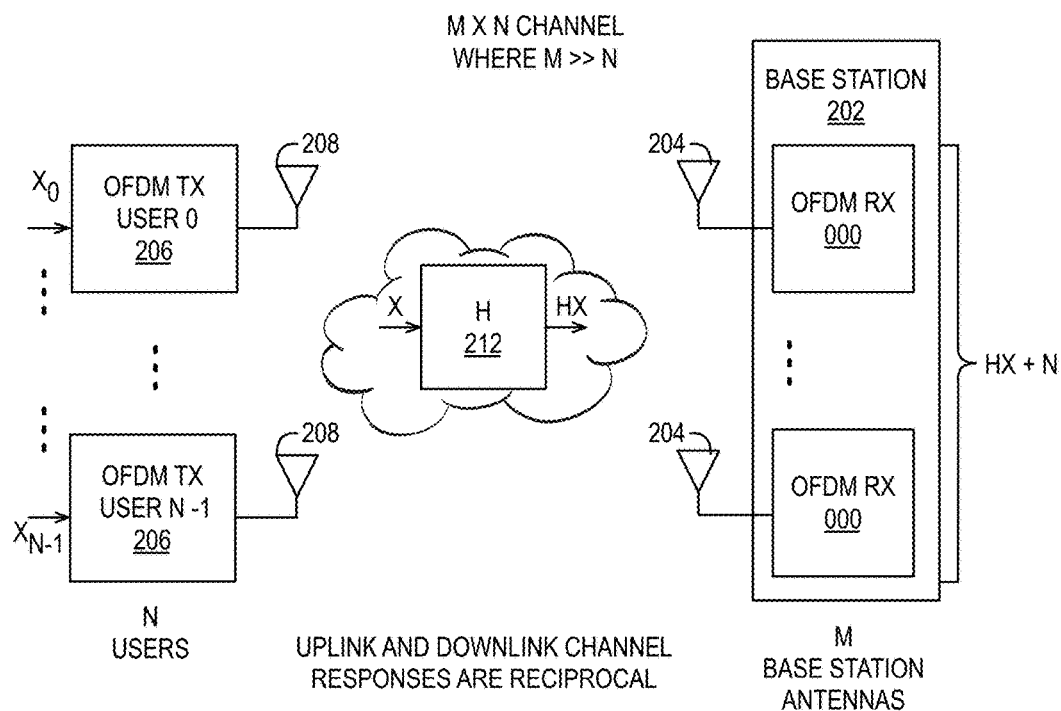
FIG. 2 (Prior Art) is a diagram for ideal channel reciprocity where OFDM (orthogonal frequency division multiplex) communications are being used between a base station with M antennas and N users of user equipment (UE) devices each having an antenna.
Figure 3:
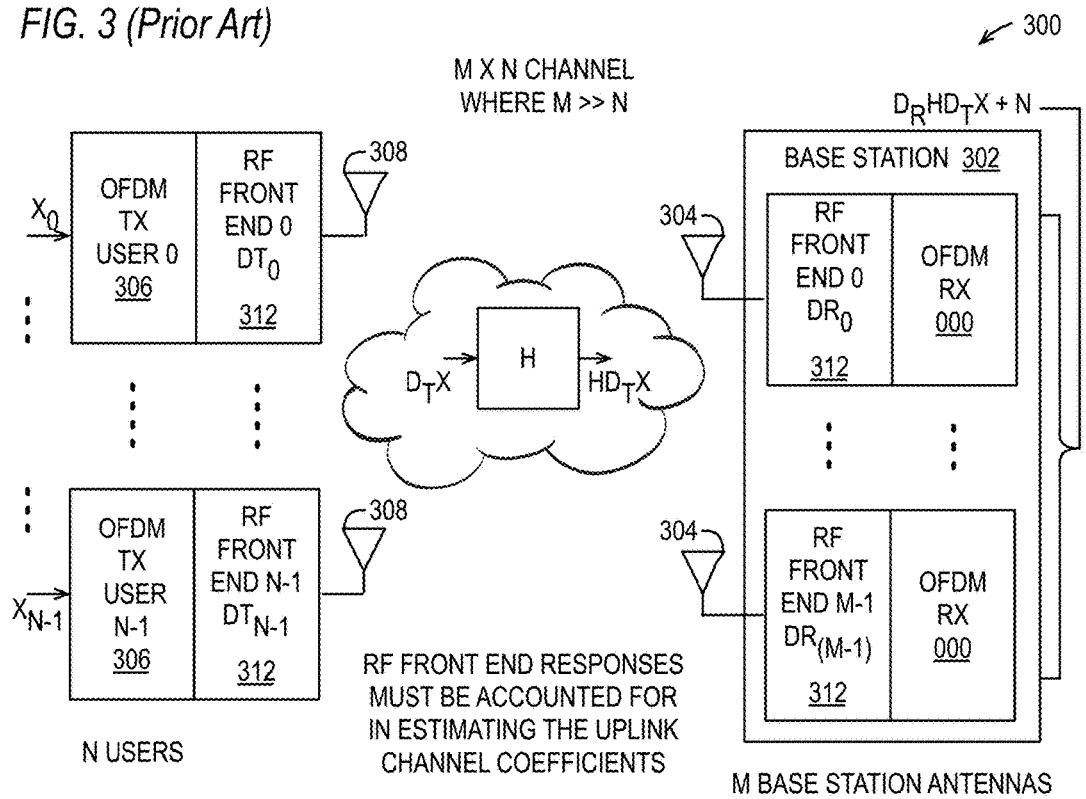
FIG. 3 (Prior Art) is a diagram for a real system including non-ideal channel reciprocity where OFDM (orthogonal frequency division multiplex) communications are being used between a base station with M antennas and N users of user equipment (UE) devices each having an antenna.

The term wireless cellular base station is intended to be interpreted according to its well-understood meaning, which includes a wireless communication station installed at a fixed location and used to communicate as part of a wireless telephone system or radio system. A wireless cellular base station has one or more antennas, and the antennas may be closely co-located (e.g., on a single panel) or not closely co-located (e.g., on multiple panels, multiple buildings).

The term user equipment (UE) is intended to be interpreted according to its well-understood meaning, which includes any of various types of computer system devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™) laptops, PDAs, portable Internet devices, music players, data storage devices, other handheld devices, as well as wearable devices such as wrist-watches, headphones, pendants, earpieces, etc. In general, the term "UE" or "UE device" can be broadly defined to encompass any electronic, computing, and/or telecommunications device (or combination of devices) which is easily transported by a user and capable of wireless communication.

The term effective uplink/downlink channel estimate is intended to be interpreted according to its well-understood meaning, which includes: an effective uplink/downlink channel estimate is an estimate of the response of the effective uplink/downlink channel which includes the wireless portion of the uplink/downlink channel and the relevant transmit and receive path circuitry of the communicating cellular devices.

The term channel reciprocity compensation is intended to be interpreted according to its well-understood meaning, which includes: channel reciprocity compensation attempts to cancel out the effect of non-reciprocal aspects of the transmit and receive path circuitry to achieve reciprocity of the uplink channel to the downlink channel.

The term channel reciprocity calibration coefficient is intended to be interpreted according to its well-understood meaning, which includes: a channel reciprocity calibration coefficient of first and second antennas is the quotient of a first product and a second product, wherein the first product is the product of the transmit path circuitry response of the first antenna and the receive path circuitry response of the second antenna, wherein the second product is the product of the receive path circuitry response of the first antenna and the transmit path circuitry response of the second antenna.

The term calibration pilot symbol is intended to be interpreted according to its well-understood meaning, which includes: a calibration pilot symbol is a block symbol that is used by cellular devices to aid in the computation of channel reciprocity calibration coefficients.

Channel reciprocity compensation embodiments for MIMO (multiple input, multiple output) communication systems are disclosed. These channel reciprocity compensation embodiments can be used, for example, with the New Radio (NR) Access Technology definition in 3GPP ($3^{rd}$ Generation Partnership Project) for base stations with multiple antennas. Example embodiments are disclosed that use intra-node compensation for multiple antenna base stations, such as eNB (eNodeB) devices for LTE (long term evolution) mobile communications, to improve over the air (OTA) channel reciprocity. Example embodiments are also disclosed that use UE (user equipment) aided compensation to improve OTA channel reciprocity. These compensation techniques can also be used alone or in combination with each other. Other variations can also be implemented while still taking advantage of the reciprocity compensation techniques described herein.

For the disclosed embodiments, one or more of the following techniques can be used to improve reciprocity compensation for MIMO base station systems (e.g., eNodeB): (1) use calibration signaling and a calibration period composed of multiple calibration pilot symbols; (2) during each calibration symbol when OTA (over the air) intra eNB reciprocity compensation is implemented, one or more of the base station antennas are transmitting and one or more of the remaining base station antennas are receiving, (3) a variety of calibration algorithms can be applied, (4) during each calibration period when OTA UE aided reciprocity compensation is implemented, one or more DL and UL calibration pilot symbols are exchanged between the eNB and one or more UEs, and/or other desired reciprocity compensation techniques.

Figure 4:
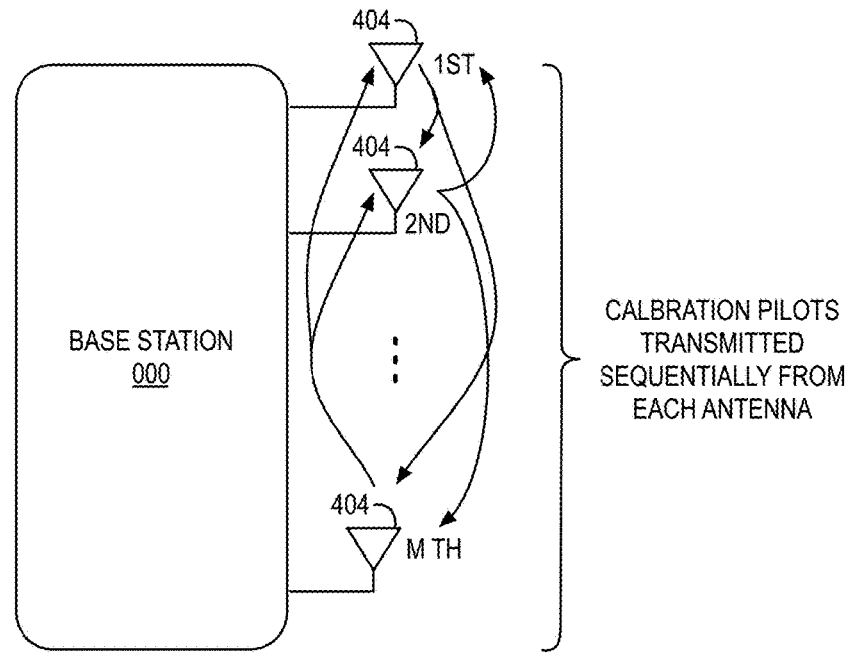
FIG. 4 is a diagram of an example embodiment for a base station (e.g., eNB) including M different antennas and using intra base station reciprocity calibration.
Figure 5:
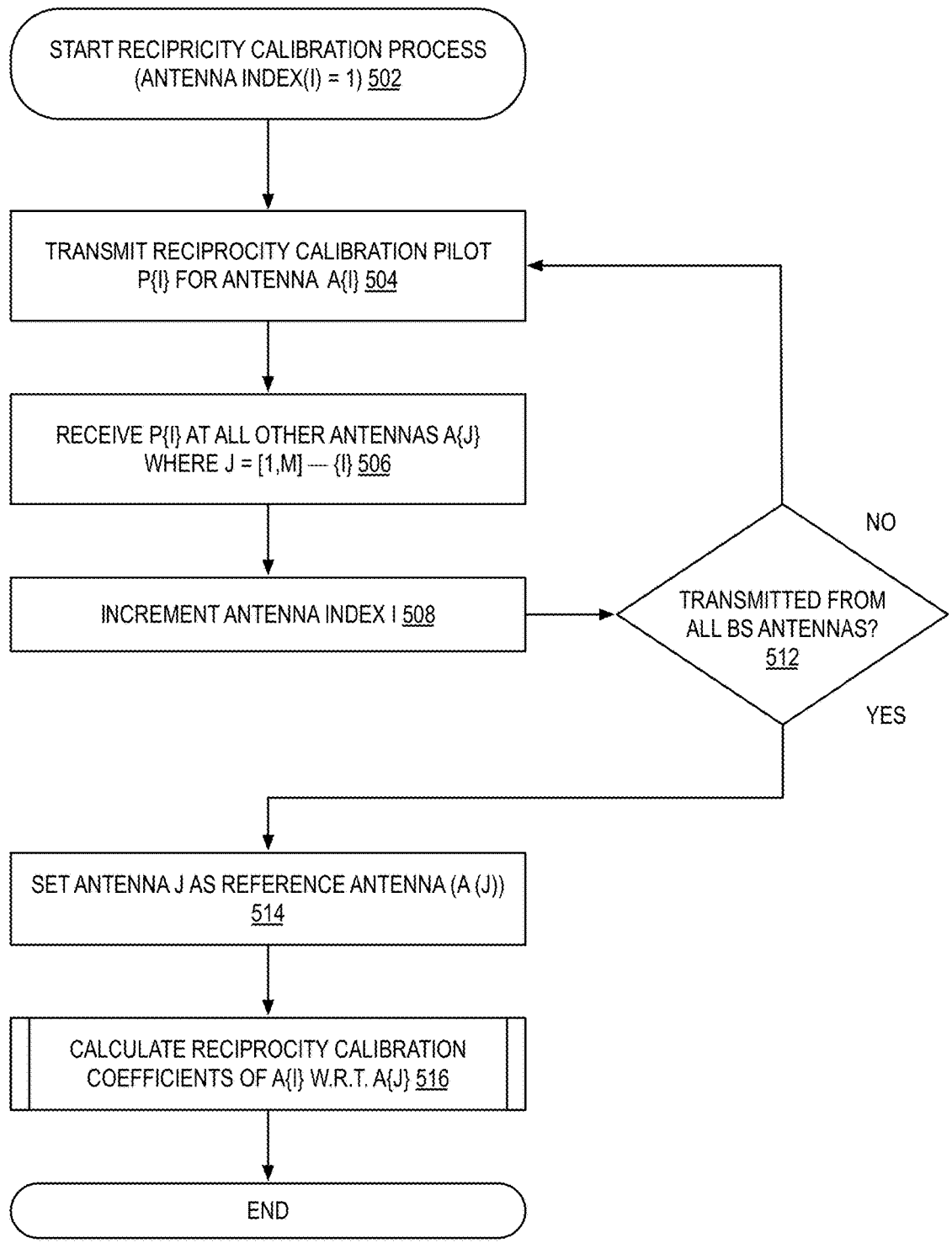
FIG. 5 is a flow diagram of an example embodiment for an intra base station (e.g., eNB) reciprocity calibration process.
Figure 6:
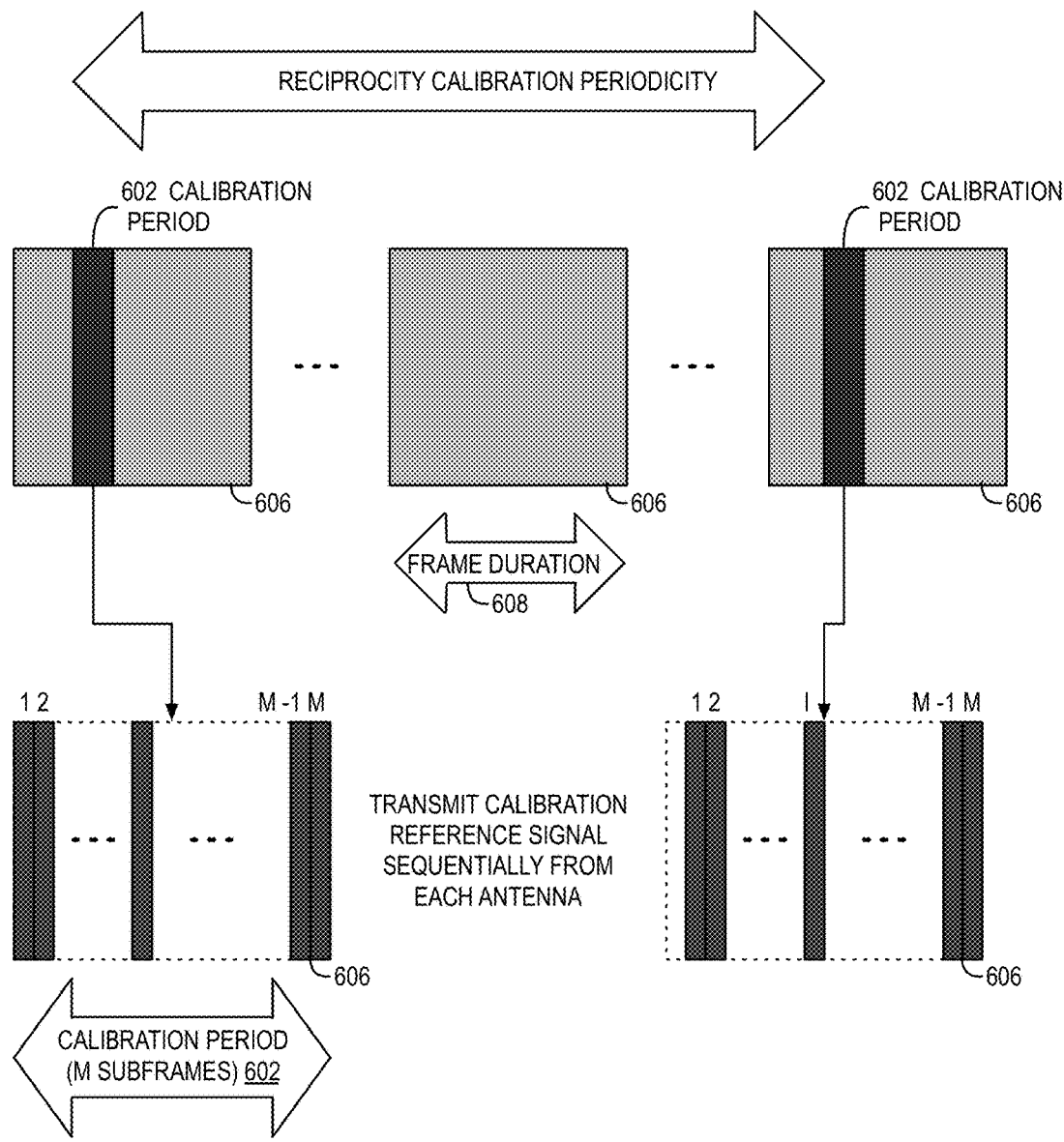
FIG. 6 is a diagram of an example embodiment for periodic reciprocity calibration periods that are used for the reciprocity calibration processing.

Example embodiments are described below to provide calibration of front-end circuitry to improve over-the-air (OTA) reciprocity. FIGS. 4-6 provide example embodiments that use intra-node compensation for a multiple antenna base station such as an eNB (eNodeB) for LTE (long term evolution) mobile communications. FIG. 7 provides an example embodiment that uses UE aided compensation to improve OTA reciprocity. It is noted that the channel reciprocity compensation techniques described herein can be used for MIMO cellular telecommunication systems such as those described in U.S. Published Patent Application 2015/0326286, entitled "MASSIVE MIMO ARCHITECTURE," U.S. Published Patent Application 2015/0326383, entitled "SYNCHRONIZATION OF LARGE ANTENNA COUNT SYSTEMS," and U.S. Published Patent Application 2015/0326291, entitled "SIGNALING AND FRAME STRUCTURE FOR MASSIVE MIMO CELLULAR TELECOMMUNICATION SYSTEMS," each of which is hereby incorporated by reference in its entirety. It is further noted that different and/or additional features can also be implemented, as desired, and related systems and methods can be utilized as well.

Looking first to FIGS. 4-6, example embodiments are shown for the intra-node compensation. For these embodiments, calibration signaling is introduced within a calibration period that includes the transmission of multiple calibration pilot symbols. Within each calibration symbol or subframe, one or more of the base station antennas are transmitting calibration pilot symbols, and one or more of the remaining base station antennas are receiving these calibration pilot symbols. For one embodiment, one of the base station antennas is selected as a reference antenna, and calibration coefficients are calculated for the other base station antennas with respect to the reference antenna. Other calibration algorithms can also be implemented.

FIG. 4 is a diagram of an example embodiment for a base station (e.g., eNB) 402 including M different antennas 404 and using intra base station reciprocity calibration. The intra base station (e.g., eNB) reciprocity calibration occurs without involving the UEs by transmitting and receiving reciprocity calibration pilots at the base station 402 itself. For example, a calibration reference signal such as a calibration pilot symbol is transmitted sequentially from each antenna 404 and received by the other non-transmitting antennas 404. The base station 402 then uses one antenna 404 as a reference antenna and uses the received signals to calculate channel reciprocity calibration coefficients for the other antennas 404 based upon the reference antenna.

FIG. 5 is a flow diagram of an example embodiment for an intra base station (e.g., eNB) reciprocity calibration process. At each instance of the reciprocity calibration process (502), the eNB enters a reciprocity calibration mode where one antenna (A(i)) transmits a reciprocity calibration pilot (P(i)) while (504) at the same time all the other antennas receive the transmitted pilot symbol (506). For the example depicted, an antenna with a first index (1) is the first to transmit the reciprocity calibration pilot that is received by the other antennas (A(j)) where j=1 to N excluding the current index (i). The antenna index (i) is then incremented (508) until all base station (BS) antennas have transmitted a reciprocity calibration pilot (512). It is noted that the reciprocity calibration pilot symbol can be a wideband signal with respect to the communication channel, and each antenna can transmit the reciprocity pilot symbol for a predetermined duration (T1). If the base station (e.g., eNB) has M antennas, the total calibration period is (M*T1). It is further noted that the total calibration period can also be set to be a multiple of the subframe duration, although other durations could also be used. It is also noted that multiple antennas can be configured to transmit pilot symbols at the same time. Other variations can also be implemented. The reciprocity calibration coefficients for each antenna may then be calculated according to steps 514 and 516 of FIG. 5, as described in more detail below with respect to FIG. 6.

For one additional embodiment, the pilot symbol or calibration signal can be a frequency multiplex of the signals from each antenna as described further with respect to FIGS. 8A-B below. As such, one RE (Resource Element) or subcarrier is used per antenna. For this embodiment, the pilot symbol or calibration signal can be one whole symbol per antenna, and M symbols can be used to cycle through all the antennas, for example, as shown in FIG. 6 discussed above. Other techniques could also be used for the pilot symbol or calibration signal such as code division multiplexing and/or other modulations schemes. Other variations could also be used for the pilot symbol while still taking advantage of the reciprocity compensation techniques described herein.

FIG. 6 is a diagram of an example embodiment for periodic reciprocity calibration periods 602 that are used for the reciprocity calibration processing. As shown, reciprocity calibration periods 602 can be repeated periodically and used to determine reciprocity coefficients for each of the M multiple antennas of a base station in a MIMO communication system. For example, each calibration period 602 can include M subframes within which calibration reference signals, such as calibration pilot symbols, are transmitted sequentially from each of the M antennas for the base station. As shown, the calibration periods 602 can be included periodically within a communication frame 606, and the communication frames 606 can have a predetermined frame duration 608, if desired.

After the calibration period 602, the base station (e.g., eNB) computes the reciprocity compensation coefficients based upon the received calibration pilot symbols. For example, one antenna (A(j)) can be set as a reference antenna (514 of FIG. 5), and the reciprocity calibration coefficients for each antenna (A(i)) can be calculated with respect to the reference antenna (A(j)) (516 of FIG. 5). Once calculated, the calibration reciprocity coefficients are then applied within the receive and/or transmit path circuitry for the MIMO communication system, such as a base station (e.g., eNodeB). For one example embodiment, the reciprocity compensation coefficients for each antenna are applied such that one coefficient is used for each subcarrier at that antenna within the transmit path, within the receive path, or within both the transmit and receive paths. For example, if applied in the transmit path, each orthogonal subcarrier (e.g., digital transmit subcarrier samples) for each transmit antenna is digitally multiplied by its corresponding reciprocity compensation coefficient prior to being converted to an analog signal and upconverted into an output RF signal transmitted from the antenna. For example, if applied in the receive path, each orthogonal subcarrier (e.g., digital receive subcarrier samples) for each receive antenna is digitally multiplied by its corresponding reciprocity compensation coefficient after being downconverted from a RF signal received at that antenna and converted to digital samples. As one example simplification, for a given antenna, the reciprocity coefficients can also be averaged over all subcarriers to obtain a single coefficient that is applied for that antenna. Other variations could also be implemented while still taking advantage of the reciprocity compensation techniques described herein.

In general, calibration coefficients for DL/UL channels can be obtained such that $$b_{i \to j} = \frac{\hat{h}_{i \to j}}{\hat{h}_{j \to i}} \text{ or } \hat{h}_{i \to j} = b_{i \to j} \cdot \hat{h}_{j \to i}$$

and coefficients are used to recover the DL channel from UL channel. The coefficients can be expressed as a ratio of reference to $k^{th}$ UE antenna to reference to $m^{th}$ BS antenna as follows:

$$\hat{h}_{m \to k} = b_{m \to k} \cdot \hat{h}_{k \to m} = \frac{b_{1 \to k}}{b_{1 \to m}} \cdot \hat{h}_{k \to m}$$

$$\frac{b_{i \to j}}{b_{i \to y}} = \frac{\frac{t_i \cdot r_j}{r_i \cdot t_j}}{\frac{t_i \cdot r_y}{r_i \cdot t_y}} = \frac{t_y \cdot r_j}{r_y \cdot t_j} = b_{y \to j}$$

$$\hat{h}_{m \to k} = \frac{b_{1 \to k}}{b_{1 \to m}} \cdot \hat{h}_{k \to m}$$

For the kth UE, all M BS antennas are affected by $b_{1 \to k}$, but such constant factor across all antennas does not affect beamforming.

$$\hat{h}'_{m \to k} = \frac{\hat{h}_{k \to m}}{b_{1 \to m}} = \hat{h}_{k \to m} \cdot b_{m \to 1}$$

This reference antenna can be on the BS which allows for removal of the UE in the calibration process, as described herein for the embodiments of FIGS. 4-6.

In a matrix form, the received signal in the UL channel is:

$$y_{UL} = D_{BS,rx} H_{UL} D_{UE,Tx} x + n$$

Estimated channel and corresponding precoder are:

$$\hat{H}_{UL} = D_{BS,rx} H_{UL} D_{UE,Tx}$$

$$F = \left( D_{Ref,Tx}^{-1} D_{Ref,Rx} D_{BS,Tx} D_{BS,Rx}^{-1} \hat{H}_{UL} \right)^{-T}$$

$$b_{m \to 1} = \frac{t_m \cdot r_1}{r_m \cdot t_1}$$

In DL, the received signal is:

$$y_{DL} = D_{UE,Rx} H_{DL} D_{BS,Tx} Fs + n$$

$$y_{DL} = D_{UE,Rx} H_{DL} D_{BS,Tx} Fs + n$$
$$= D_{UE,Rx} H_{DL} D_{BS,Tx} \left( D_{Ref,Tx}^{-1} D_{Ref,Rx} D_{BS,Tx} D_{BS,Rx}^{-1} \hat{H}_{UL} \right)^{-T} s + n$$
$$= D_{UE,Rx} H_{DL} D_{BS,Tx} \left( D_{Ref,Tx}^{-1} D_{Ref,Rx} D_{BS,Tx} D_{BS,Rx}^{-1} D_{BS,tx} H_{UL} D_{UE,Tx} \right)^{-T}$$
$$s + n$$
$$= Ds + n$$

After cancelling matrices, the expression becomes a product of an unknown diagonal matrix and transmitted symbols without inter-user interference. The unknown diagonal matrix can be equalized with a DL pilot.

It is noted that there are scenarios in which intra base station (e.g., eNB) over-the-air (OTA) reciprocity compensation techniques may not be practical, and UE aided compensation can be used to improve OTA reciprocity calibration. One example of such a scenario is if the base station may not support simultaneous transmission and reception on non-overlapping subset of antennas, and all the antennas can either transmit or receive at any given time instance. Another situation arises when the SNR (signal to noise ratio) at the received antenna is not sufficient to estimate the reciprocity coefficients reliably, for example, if the transmit beams are highly directive. Conversely, if the beam width is broad, and high transmission power on the transmitting antenna(s) can saturate the receiver chains on the co-located receiving antennas, the reciprocity coefficients may not be able to be accurately determined. Such accuracy can also be adversely affected where PA/LNA (power amplifier/low noise amplifier) operating points have to be significantly different from normal link operations during reciprocity calibration periods.

For the UE aided reciprocity compensation embodiments, one or more DL and UL calibration pilot symbols are exchanged between the base station (e.g., eNB) and one or more UEs during each calibration period. The UEs can then provide back feedback information concerning the calibration pilot symbols that can be used to improve the reciprocity compensation. As such, for these UE aided embodiments, one or more UEs are also involved in calibrating the base station (e.g., eNB) antennas. It is noted that one advantage of incorporating the UE aided compensation into the reciprocity calibration scheme is that existing signaling can be reused with minor modifications.

FIG. 7 is a swim lane diagram of an example embodiment where UE aided compensation is used to improve OTA reciprocity calibration. For the embodiment depicted, the following procedure is implemented, although additional and/or different process steps could also be utilized:

Step 1: The base station (e.g., eNB) signals an upcoming calibration procedure to the UE using higher layer signaling (e.g., RRC (radio resource control) signaling).

Step 2: The base station (e.g., eNB) transmits a DL calibration pilot symbol(s), which is used by UE to compute the effective DL channel estimate.

Step 3: After receiving the DL calibration pilot, the UE transmits the UL calibration pilot symbol(s) within the same subframe, which is used by the base station (e.g., eNB) to compute the effective UL channel estimate.

Step 4: In its next UL grant, the UE feeds back the effective DL channel estimate it has computed in Step 2 as feedback information.

Step 5: The base station (e.g., eNB) computes the reciprocity coefficients.

For the UE aided compensation embodiments, it is noted that the calibration period 702 includes the time interval starting from transmission of the DL calibration pilot and ending with the reception of the UL calibration pilot. For the calibration coefficients to be calculated, the channel can be assumed to be constant over this duration; however, this assumption does impose a constraint that the calibration period should be smaller than the channel coherence time.

It is also noted that the pilot symbol can include one RE (Resource Element) per base station (e.g., eNB) antenna element so that the pilot RE from each antenna are orthogonal in frequency. In addition, if the calibration coefficients are not sufficiently flat over a band of M*fsc Hz, then additional calibration pilot symbols with a staggered placement of pilots from the antennas relative to first symbol can be used. Other variations can also be implemented.

Figure 8A:
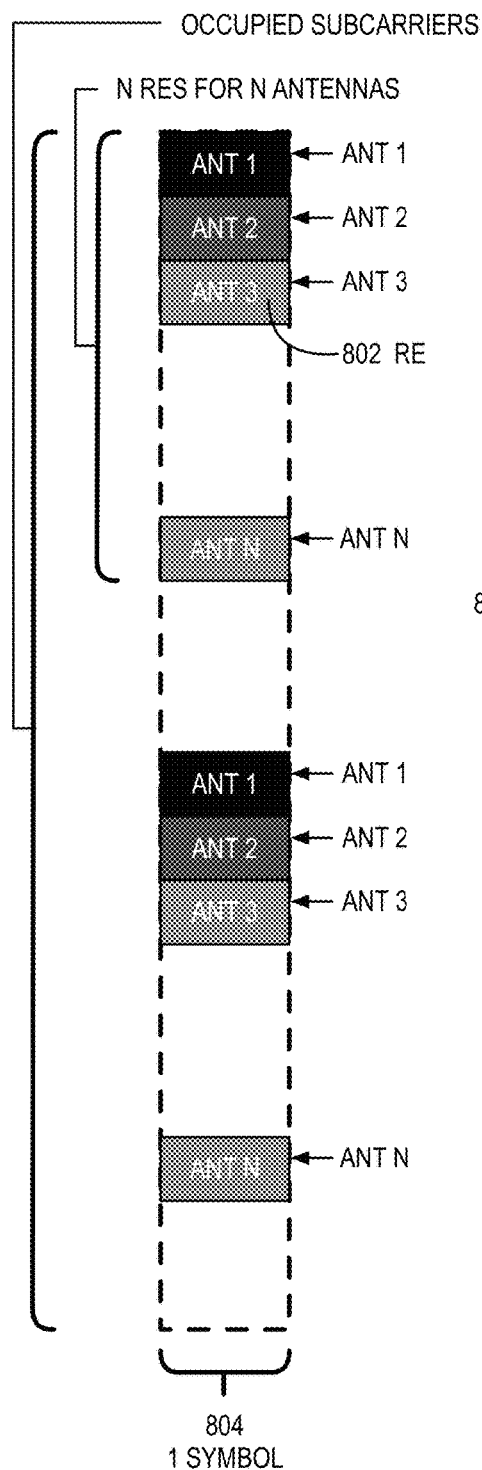
FIGS. 8A and 8B are diagrams of example embodiments where one RE (Resource Element) or subcarrier is used per antenna for each antenna element.
Figure 8B:
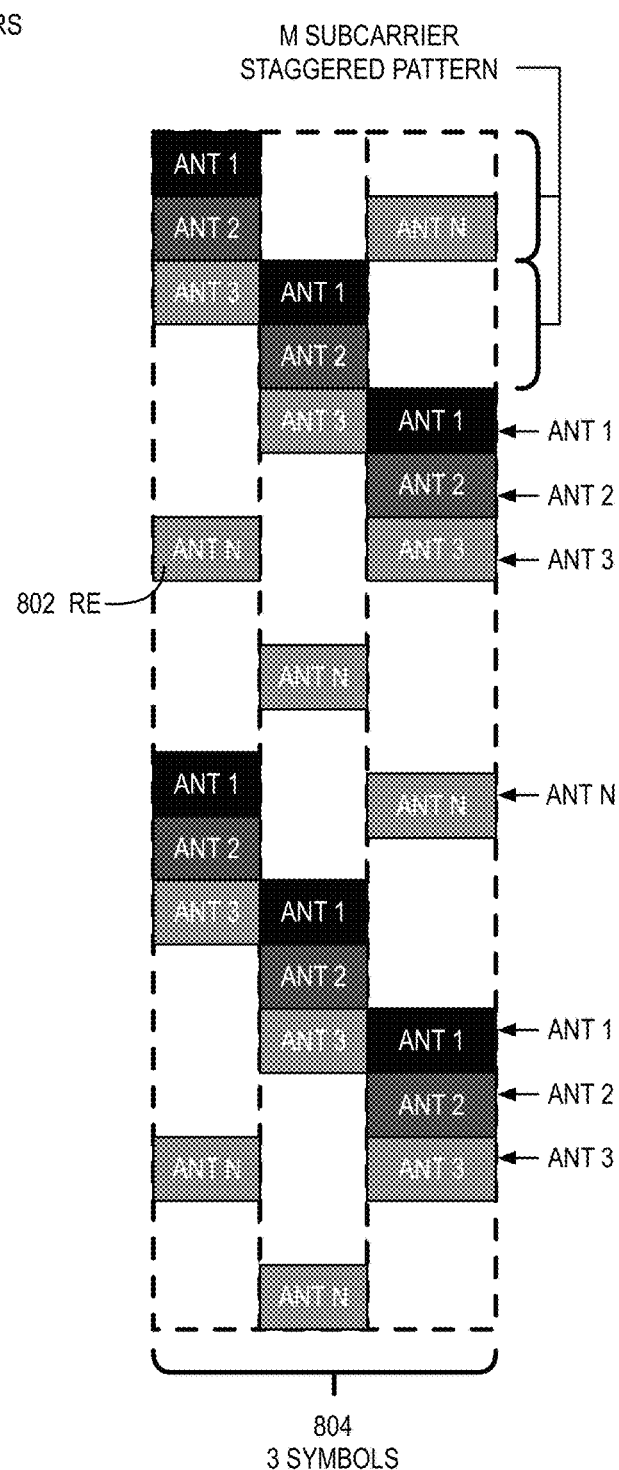

FIGS. 8A-B are diagrams of example embodiments where one RE (Resource Element) 802 or subcarrier is used per antenna for each antenna element. Looking in more detail to FIG. 8A, one (1) symbol 804 is used for all N base station antennas. First, N REs 802 are used by N antennas in sequence, and all N antennas are cycled through until the REs 802 run out. For example, in LTE there are typically 1200 REs 802, and assuming for example that the base station included 128 antennas, each antenna would get 9 REs 802 in the symbol 804. Looking now to FIG. 8B, the same thing happens as in FIG. 8A except that three symbols 804 are used along with an M subcarrier offset. The first symbol 804 is same as in FIG. 8A with Symbol1 RE1=Antenna1, Symbol1_RE2=Antenna2, and so on. The second symbol 804 has antennas staggered such that Symbol 2 RE1=Antenna(1+M), Symbol2 RE2=Antenna(2+M), and so on. And the third symbol 804 has a further offset of M REs 802. Other variations can also be implemented. It is also noted that for FIGS. 8A-B, the number of antennas for a base station is designated as "N" and the subcarrier offset in FIG. 8B is designated as "M," where in other embodiments described herein the number of antennas for a base station is designated as "M."

With respect to the UE aided compensation, it is noted that for a given subcarrier (or antenna) j, let $$\beta_j = \left(\frac{\hat{h}_{e_{DL}}}{\hat{h}_{e_{UL}}}\right) = \alpha\left(\frac{\hat{g}_{B_t}}{\hat{g}_{B_r}}\right), \text{ where}$$

$$\alpha = \frac{\hat{g}_{U_r}}{\hat{g}_{U_t}}k, \text{ and "}k\text{" is scaling.}$$

It is noted that $\alpha$ is assumed to be constant over measurement interval and for all j. Relative reciprocity coefficients can be found by:

$$\beta_{ji} = \frac{\beta_j}{\beta_i} = \frac{\alpha(\hat{g}_{B_t}/\hat{g}_{B_r})_j}{\alpha(\hat{g}_{B_t}/\hat{g}_{B_r})_i} = \frac{\hat{g}_{t,j} \cdot \hat{g}_{r,i}}{\hat{g}_{t,i} \cdot \hat{g}_{r,j}}$$

$$b_{m \to 1} = \frac{t_m \cdot r_1}{r_m \cdot t_1}$$

For further embodiments, a modified UL calibration pilot can also be used. For example, instead of an independent UL calibration pilot, a reciprocal of the DL channel estimate can also be transmitted as the UL calibration signal. As such, the jth subcarrier of the UL calibration signal is the reciprocal of the effective DL channel estimate at the jth subcarrier.

$$(P_{UL})_j = \frac{1}{\hat{h}_{e_{DL}}}$$

With such a modification, the base station can directly estimate the reciprocity calibration coefficients for each subcarrier. There is a reduction in latency as there is no requirement for an explicit feedback of the effective DL channel. However, there can be an increase in channel estimation errors as well as a higher sensitivity to noise as an inverse of the channel estimate is involved.

Figure 9:
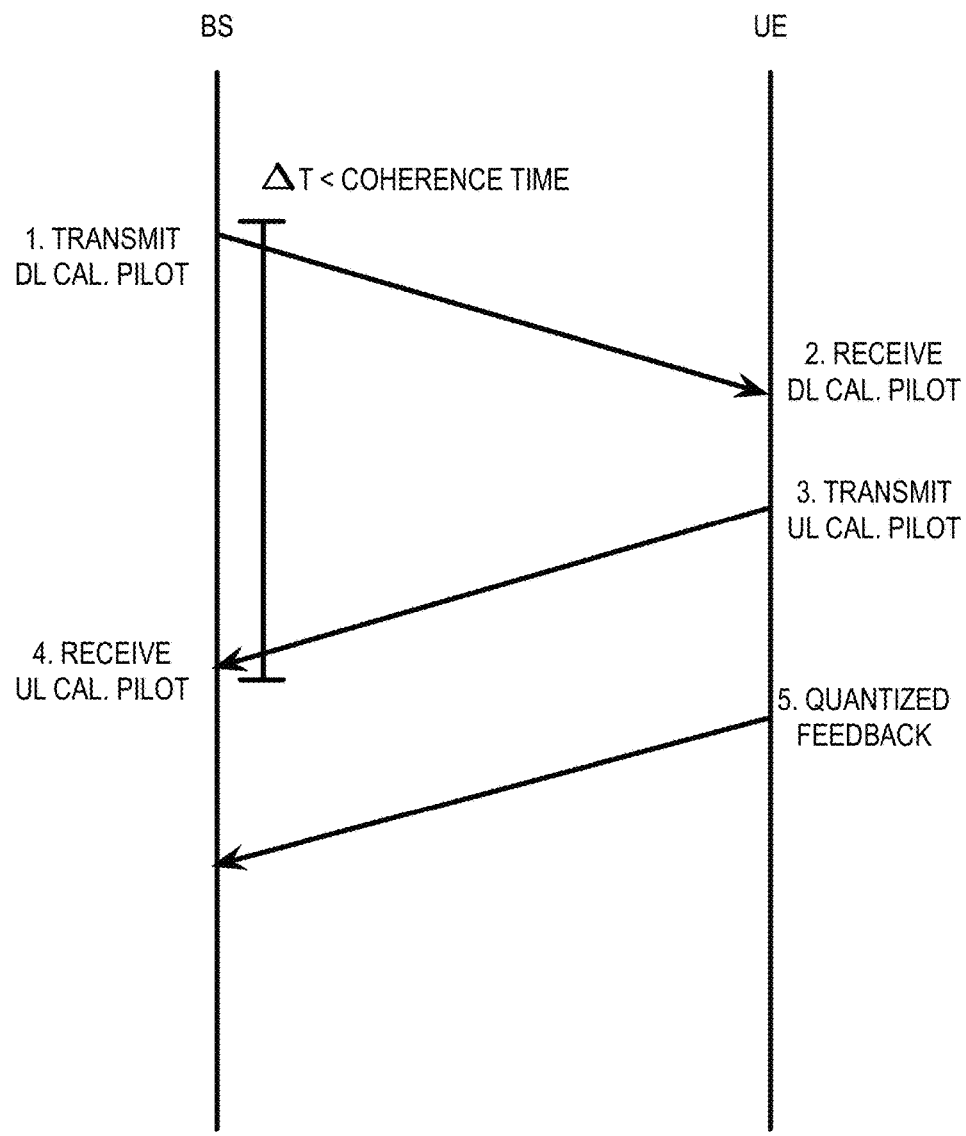
FIG. 9 is a swim lane diagram of an example embodiment where UE aided compensation is used to improve OTA reciprocity calibration with implicit feedback through turn-around of a downlink (DL) pilot.

FIG. 9 is a swim lane diagram of an example embodiment where UE aided compensation is used to improve OTA reciprocity calibration with implicit feedback through turn-around of a downlink (DL) pilot. For this example embodiment, the following communications occur between the base station (BS) and UE:

Step 1: BS sends DL pilot to UE.

Step 2: UE receives the DL pilot and determines a channel estimate for the DL pilot.

Step 3: UE sends a UL pilot to BS that is an inverted version of the DL channel estimate.

Step 4: BS receives the UL pilot and uses it for reciprocity compensation.

It is also noted that further refinements can also be applied, such as normalization of ill-conditioned values in the UL transmission through (5.) quantization feedback as shown in FIG. 9. Other variations can also be implemented.

Figure 10:
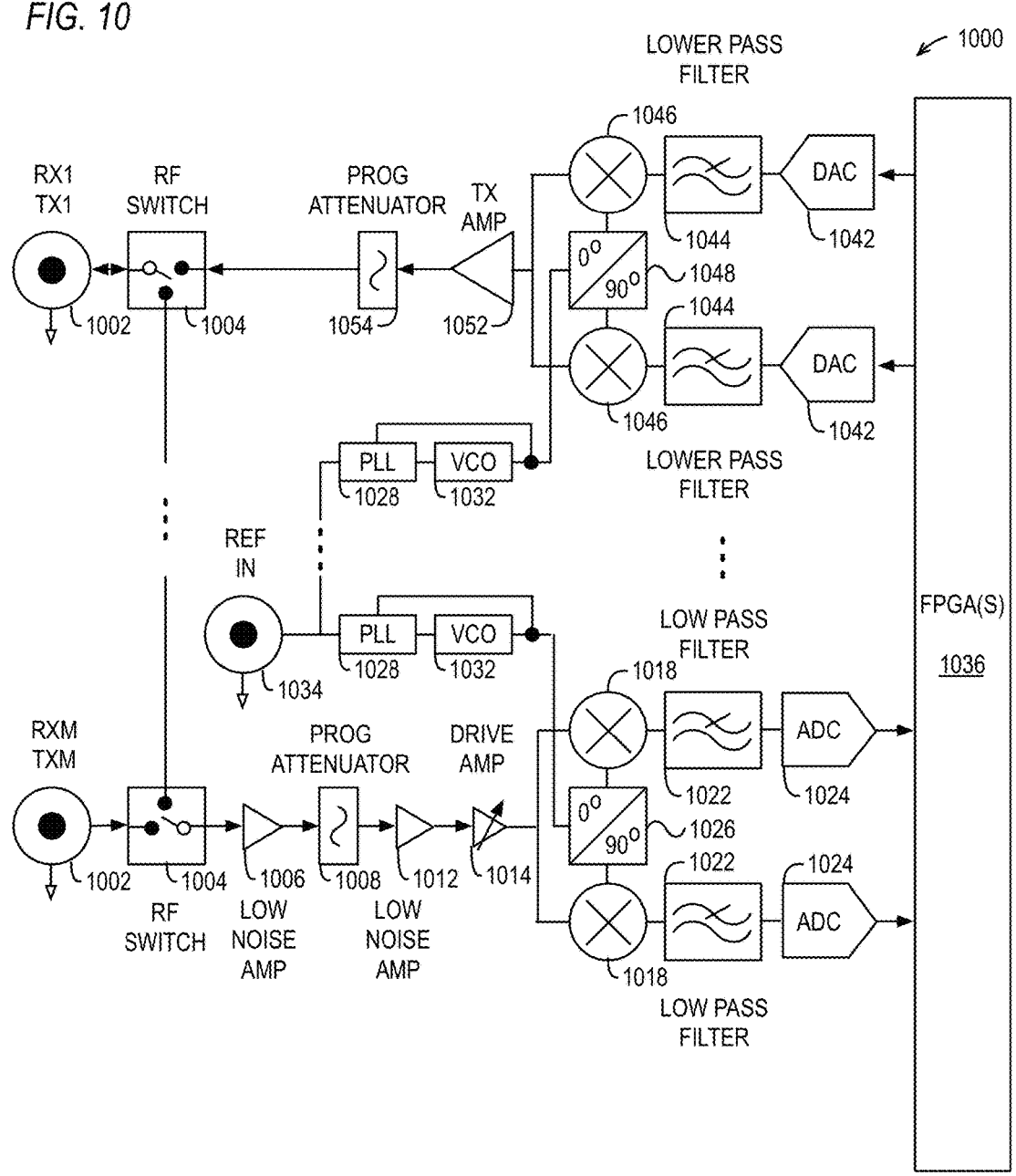
FIG. 10 is a diagram of an example embodiment for front end circuitry that can be used for transmit and receive in base stations and/or user equipment (UE).

FIG. 10 is a diagram of an example embodiment for front end circuitry 1000 that can be used for transmit and receive in base stations and/or user equipment (UE). For the example embodiment, M different antennas 1002 are shown that can be used to transmit and receive RF signals that include the communication frames (RX1/TX1 . . . RXM/TXM). RF switches 1004 are coupled to these antennas 1002 so that each can be selectively connected to transmit path circuitry or receive path circuitry. It is noted that the antenna circuitry, transmit path circuitry, and receive path circuitry are example embodiments and other implementation could be used while still taking advantage of the reciprocity compensation techniques described herein.

The receive path circuitry includes a low noise amplifier 1006, a programmable attenuator 1008, a further low noise amplifier 1012, and a variable gain drive amplifier 1014 that receive the incoming RF signal and provide output signals to quadrature mixing circuitry. The quadrature mixing circuitry includes a real (I) path and a quadrature (Q) path. The I/Q paths each include a mixer 1018 that down converts the RF signal, for example to an IF signal or zero IF signal, followed by a low pass filter 1022 and an ADC 1024 (analog to digital converter). The mixers 1018 also receive local oscillator (LO) signals from an LO generator 1026 that generates signals that are offset by 90 degrees. The LO generator 1026 receives an RF mixing signal from the PLL (phase lock loop) circuitry 1028 and VCO (voltage controlled oscillator) circuitry 1032 which receives an input reference signal, for example, from a crystal oscillator 1034. The ADCs 1024 can output digital samples to one or more programmable processing devices 1036 such as, for example, programmable FPGAs (field programmable gate arrays), which further digitally process the receive path digital samples such as calculating and applying reciprocity compensation coefficients. Additional circuitry and/or variations could also be applied to the receive path circuitry.

The transmit path circuitry includes quadrature mixing circuitry including a real (I) path and a quadrature (Q) path. The I/Q paths each include a DAC 1042 (digital to analog converter), a low pass filter 1044, and a mixer 1046 that up converts the output of the DACs 1042, for example to a zero IF signal or IF signal, to an RF signal. The mixers 1046 also receive local oscillator (LO) signals from an LO generator 1048 that generates signals that are offset by 90 degrees. The LO generator 1048 receives an RF mixing signal from the PLL (phase lock loop) circuitry 1028 and VCO (voltage controlled oscillator) circuitry 1032 which receives a input reference signal, for example, from a crystal oscillator. The outputs of the mixers 1046 are combined and provided to a transmit amplifier 1052. The output of the transmit amplifier 1052 is provided to a programmable attenuator 1054, which provides its output to an RF switch 1004. The DACs 1042 can receive digital samples from one or more programmable processing devices 1036 such as, for example, programmable FPGAs (field programmable gate arrays), which digitally process the transmit path digital samples such as calculating and applying reciprocity compensation coefficients. Additional circuitry and/or variations could also be applied to the receive path circuitry.

It is noted that the antenna circuitry, transmit path circuitry, and receive path circuitry in FIG. 10 are example embodiments and other implementation could be used while still taking advantage of the reciprocity compensation techniques described herein. For example, transmit and receive path circuitry could be associated with each antenna. In addition, when the circuitry depicted is used in a UE, a single antenna could be provided along with the receive path circuitry and the transmit path circuitry. Other variations could also be implemented.

It is also noted that the functional blocks described herein can be implemented using hardware, software, or a combination of hardware and software, as desired. In addition, one or more processors or processing circuitry running software and/or firmware can also be used, as desired, to implement the disclosed embodiments. It is further understood that one or more of the operations, tasks, functions, or methodologies described herein may be implemented, for example, as software or firmware and/or other program instructions that are embodied in one or more non-transitory tangible computer readable mediums (e.g., memory) and that are executed by one or more controllers, microcontrollers, microprocessors, hardware accelerators, and/or other processors or processing circuitry to perform the operations and functions described herein.

It is further noted that the functional blocks, devices, and/or circuitry described herein can be implemented using hardware, software, or a combination of hardware and software. In addition, one or more processors (e.g., central processing units (CPUs), controllers, microcontrollers, microprocessors, hardware accelerators, programmable integrated circuitry, FPGAs (field programmable gate arrays), ASICs (application specific integrated circuits), and/or other programmable processing circuitry) can be programmed to perform the operations, tasks, functions, or actions described herein for the disclosed embodiments. For example, the one or more electronic circuits can be configured to execute or otherwise be programmed with software, firmware, logic, and/or other program instructions stored in one or more non-transitory tangible computer-readable mediums (e.g., data storage devices, flash memory, random access memory, read only memory, programmable memory devices, reprogrammable storage devices, hard drives, floppy disks, DVDs, CD-ROMs, and/or any other tangible data storage medium) to perform the operations, tasks, functions, or actions described herein for the disclosed embodiments.

It is still further noted that the functional blocks, components, systems, devices, and/or circuitry described herein can be implemented using hardware, software, or a combination of hardware and software. For example, the disclosed embodiments can be implemented using one or more programmable integrated circuits that are programmed to perform the functions, tasks, methods, actions, and/or other operational features described herein for the disclosed embodiments. The one or more programmable integrated circuits can include, for example, one or more processors and/or PLDs (programmable logic devices). The one or more processors can be, for example, one or more central processing units (CPUs), controllers, microcontrollers, microprocessors, hardware accelerators, ASICs (application specific integrated circuit), and/or other integrated processing devices. The one or more PLDs can be, for example, one or more CPLDs (complex programmable logic devices), FPGAs (field programmable gate arrays), PLAs (programmable logic array), reconfigurable logic circuits, and/or other integrated logic devices. Further, the programmable integrated circuits, including the one or more processors, can be configured to execute software, firmware, code, and/or other program instructions that are embodied in one or more non-transitory tangible computer-readable mediums to perform the functions, tasks, methods, actions, and/or other operational features described herein for the disclosed embodiments. The programmable integrated circuits, including the one or more PLDs, can also be programmed using logic code, logic definitions, hardware description languages, configuration files, and/or other logic instructions that are embodied in one or more non-transitory tangible computer-readable mediums to perform the functions, tasks, methods, actions, and/or other operational features described herein for the disclosed embodiments. In addition, the one or more non-transitory tangible computer-readable mediums can include, for example, one or more data storage devices, memory devices, flash memories, random access memories, read only memories, programmable memory devices, reprogrammable storage devices, hard drives, floppy disks, DVDs, CD-ROMs, and/or any other non-transitory tangible computer-readable mediums. Other variations can also be implemented while still taking advantage of the reciprocity compensation techniques described herein.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

The invention claimed is:

1. A method, comprising:
   transmitting, by a cellular base station, a downlink calibration pilot symbol;
   computing, by a user equipment (UE), an effective downlink channel estimate using the downlink calibration pilot symbol received from the base station;
   transmitting, by the UE, an uplink calibration pilot symbol;
   computing, by the base station, an effective uplink channel estimate using the uplink calibration pilot symbol received from the UE;
   transmitting, by the UE, the effective downlink channel estimate;
   computing, by the base station, channel reciprocity calibration coefficients using the effective downlink channel estimate received from the UE and the effective uplink channel estimate computed by the base station;
   applying the calculated channel reciprocity calibration coefficients within receive and/or transmit path circuitry of the base station;
   wherein said applying the calculated channel reciprocity calibration coefficients within transmit path circuitry of the base station comprises:
   digitally multiplying digital transmit samples by the calculated channel reciprocity calibration coefficients prior to being converted to an analog signal and upconverted into an output RF signal and transmitted; and
   wherein said applying the calculated channel reciprocity calibration coefficients within receive path circuitry of the base station comprises:
   digitally multiplying digital receive samples by the calculated channel reciprocity calibration coefficients after being downconverted from a received RF signal and converted to the digital receive samples.

2. The method of claim 1, further comprising:
   wherein the UE transmits the uplink calibration pilot symbol within a channel coherence time as the base station transmits the downlink calibration pilot symbol.

3. The method of claim 1, further comprising:
   wherein the base station comprises a plurality of antennas; and
   wherein said computing the channel reciprocity calibration coefficients using the effective downlink channel estimate received from the UE and the effective uplink channel estimate computed by the base station is performed for each antenna of the plurality of antennas of the base station.

4. The method of claim 3, further comprising:
   wherein said transmitting the downlink calibration pilot symbols is performed in a frequency-multiplexed manner using a different frequency subcarrier per antenna of the plurality of antennas.

5. The method of claim 1, further comprising:
   wherein the base station comprises a plurality of antennas;
   wherein said computing the channel reciprocity calibration coefficients using the effective downlink channel estimate received from the UE and the effective uplink channel estimate computed by the base station is performed for each antenna of the plurality of antennas of the base station;
   wherein said applying the calculated channel reciprocity calibration coefficients within transmit path circuitry of the base station comprises, for each antenna of the plurality of antennas:
   digitally multiplying digital transmit subcarrier samples by the calculated channel reciprocity calibration coefficients corresponding to the antenna prior to being converted to an analog signal and upconverted into an output RF signal transmitted from the antenna; and
   wherein said applying the calculated channel reciprocity calibration coefficients within receive path circuitry of the base station comprises, for each antenna of the plurality of antennas:
   digitally multiplying digital receive subcarrier samples by the calculated channel reciprocity calibration coefficients corresponding to the antenna after being downconverted from a RF signal received at the antenna and converted to the digital receive subcarrier samples.

6. A wireless cellular base station, comprising:
   a transmitter that transmits a downlink calibration pilot symbol;
   a receiver that receives from a user equipment (UE):
   an uplink calibration pilot symbol; and
   an effective downlink channel estimate transmitted by the UE, the effective downlink channel estimate being computed by the UE using the downlink calibration pilot symbol received from the base station;
   one or more processing devices that compute:
   an effective uplink channel estimate using the uplink calibration pilot symbol received from the UE; and channel reciprocity calibration coefficients using the effective downlink channel estimate received from the UE and the effective uplink channel estimate computed by the base station;

wherein the base station applies the calculated channel reciprocity calibration coefficients within receiver and/or transmitter;

wherein to apply the calculated channel reciprocity calibration coefficients within transmit path circuitry of the base station, the base station:

digitally multiplies digital transmit samples by the calculated channel reciprocity calibration coefficients prior to being converted to an analog signal and upconverted into an output RF signal and transmitted; and wherein to apply the calculated channel reciprocity calibration coefficients within receive path circuitry of the base station, the base station:

digitally multiplies digital receive samples by the calculated channel reciprocity calibration coefficients after being downconverted from a received RF signal and converted to the digital receive samples.

7. The wireless cellular base station of claim 6, further comprising:

wherein the transmission of the downlink and uplink calibration pilot symbols are within a channel coherence time.

8. The wireless cellular base station of claim 6, further comprising:

a plurality of antennas; and wherein the one or more processing devices compute the channel reciprocity calibration coefficients using the effective downlink channel estimate received from the UE and the effective uplink channel estimate computed by the base station for each antenna of the plurality of antennas.

9. The wireless cellular base station of claim 8, further comprising:

wherein the transmitter transmits the downlink calibration pilot symbols in a frequency-multiplexed manner using a different frequency subcarrier per antenna of the plurality of antennas.

10. The wireless cellular base station of claim 6, wherein the base station comprises a plurality of antennas;

wherein to computes the channel reciprocity calibration coefficients using the effective downlink channel estimate received from the UE and the effective uplink channel estimate computed for each antenna of the plurality of antennas of the base station;

wherein to apply the calculated channel reciprocity calibration coefficients within transmit path circuitry of the base station comprises, for each antenna of the plurality of antennas:

digitally multiplies digital transmit subcarrier samples by the calculated channel reciprocity calibration coefficients corresponding to the antenna prior to being converted to an analog signal and upconverted into an output RF signal transmitted from the antenna; and wherein to apply the calculated channel reciprocity calibration coefficients within receive path circuitry of the base station comprises, for each antenna of the plurality of antennas:

digitally multiplies digital receive subcarrier samples by the calculated channel reciprocity calibration coefficients corresponding to the antenna after being downconverted from a RF signal received at the antenna and converted to the digital receive subcarrier samples.

* * * * *